US 11,323,903 B2

(12) United States Patent
Berggren et al.

(10) Patent No.: US 11,323,903 B2
(45) Date of Patent: May 3, 2022

(54) CONNECTION STATE-DEPENDENT CHANNEL MEASUREMENT

(71) Applicant: SONY GROUP CORPORATION, Tokyo (JP)

(72) Inventors: Anders Berggren, Lund (SE); Rickard Ljung, Helsingborg (SE)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 16/348,024

(22) PCT Filed: Oct. 5, 2016

(86) PCT No.: PCT/EP2016/073793
§ 371 (c)(1),
(2) Date: May 7, 2019

(87) PCT Pub. No.: WO2018/065050
PCT Pub. Date: Apr. 12, 2018

(65) Prior Publication Data
US 2019/0306738 A1 Oct. 3, 2019

(51) Int. Cl.
*H04W 24/10* (2009.01)
*H04W 24/08* (2009.01)
*H04W 48/16* (2009.01)

(52) U.S. Cl.
CPC .......... *H04W 24/10* (2013.01); *H04W 24/08* (2013.01); *H04W 48/16* (2013.01)

(58) Field of Classification Search
CPC ..... H04W 24/10; H04W 24/08; H04W 48/16; H04W 28/0231; H04W 28/0236;
(Continued)

(56) References Cited

U.S. PATENT DOCUMENTS 9,125,095 B2 * 9/2015 Hapsari ................. H04B 17/309
9,491,643 B2 * 11/2016 Hapsari ................. H04W 24/08
(Continued)

FOREIGN PATENT DOCUMENTS

CN       101931981 A       12/2010
CN       102149106 A       8/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)" 3GPP Standard; 3GPP TS 36.331 (2016)(644 pages).
(Continued)

*Primary Examiner* — Hanh N Nguyen
(74) *Attorney, Agent, or Firm* — Myers Bigel, P.A.

(57) ABSTRACT

A wireless communication device receives control information from the wireless communication network. The control information indicates at least a first measurement configuration for channel measurements to be applied in a first connection state of the wireless communication device and a second measurement configuration for channel measurements to be applied in a second connection state of the wireless communication device. If the wireless communication device is in the first connection state, the wireless communication device controls channel measurements by the wireless communication device according to the first measurement configuration. If the wireless communication device is in the second connection state, the wireless communication device controls channel measurements by the wireless communication device according to the second measurement configuration.

25 Claims, 4 Drawing Sheets (58) Field of Classification Search
CPC ............. H04W 28/0268; H04W 28/00; H04W 28/021; H04W 52/0251; H04W 72/02; H04W 72/0453; H04L 5/0085; H04L 5/006; H04B 17/24; H04B 17/309
See application file for complete search history.

(56) References Cited

U.S. PATENT DOCUMENTS

| | | | |
|---|---|---|---|
| 10,117,199 B2* | 10/2018 | Yum | H04L 27/0008 |
| 10,993,208 B2* | 4/2021 | Feng | H04W 72/0453 |
| 2011/0103249 A1 | 5/2011 | Hee et al. | |
| 2012/0307669 A1* | 12/2012 | Kim | H04W 24/10 370/252 |
| 2013/0322279 A1 | 12/2013 | Chincholi et al. | |
| 2017/0195906 A1* | 7/2017 | Dalsgaard | H04L 1/20 |
| 2017/0339580 A1* | 11/2017 | Martin | H04W 24/02 |

FOREIGN PATENT DOCUMENTS

| | | |
|---|---|---|
| CN | 102752787 A | 10/2012 |
| CN | 103155620 A | 6/2013 |
| WO | 2012020829 A1 | 2/2012 |
| WO | 2015171166 A1 | 11/2015 |
| WO | 2016075124 | 5/2016 |

OTHER PUBLICATIONS

"Dynamic Carrier Selection for LAA" HTC, 3GPP Draft; R1-164905 Dynamic Carrier Selection for LAA, 3rd Generation Partnership Project (3GPP), retrieved from the Internet: http://www.3gpp.org/ftp/tsg_ran/WG1_RL1/TSGR1_85/Docs (2016).

"RRM Measurements for NR" AT&T, 3GPP Draft; R1-1612364 NR-RRM, 3rd Generation Partnership Project (3GPP), retrieved from the Internet: http://www.3gpp.org/ftp/tsg_ran/WG1_RL1/TSGR1_87/Docs (2016).

International Search Report and Written Opinion of the International Searching Authority corresponding to International Patent Application No. PCT/EP2016/073793, dated Nov. 5, 2017. (13 pages).

"First Office Action", CN Application No. 201680089841.1, dated Sep. 16, 2021, 12 pp.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V13.5.0, Sep. 2016, 313 pp.

* cited by examiner

CONNECTION STATE-DEPENDENT CHANNEL MEASUREMENT

CROSS REFERENCE TO RELATED APPLICATIONS

This application is a 35 U.S.C. § 371 national stage application of PCT International Application No. PCT/EP2016/073793, filed on Oct. 5, 2016, the contents of which are incorporated herein by reference in its entirety. The above-referenced PCT International Application was published in the English language as International Publication No. WO 2018/065050 A1 on Apr. 12, 2018.

FIELD OF THE INVENTION

The present invention relates to methods of controlling measurements in a wireless communication network and to corresponding devices.

BACKGROUND OF THE INVENTION

Wireless communication networks, such as a cellular network based on the LTE (Long Term Evolution) radio technology specified by 3GPP ($3^{rd}$ Generation Partnership Project), are typically operated in licensed frequency bands, i.e., using frequencies or frequency ranges which are exclusively assigned to one operator. The operator may then manage utilization of the assigned licensed frequencies in such a way that conflicting usage of the same frequency may be avoided.

In order to increase the amount of usable frequency resources in the wireless communication network, it was suggested to supplement the LTE radio technology with a technology referred to as licensed assisted access (LAA), see, e.g., 3GPP TR 36.889 V13.0.0 (June 2015). By means of the LAA technology, also frequencies from an unlicensed frequency band, in particular frequencies shared with other operators or radio technologies, may be used by the LTE network. In the LAA technology, radio transmissions on one or more carriers from the unlicensed frequency spectrum are controlled by a control channel established in a licensed frequency band, e.g., a control channel of a primary cell.

In view of the possibility to additionally use frequencies from unlicensed frequency bands, also new channel measurements are specified, as one type of measurement a user equipment (UE) may perform while being in RRC connected state, i.e., while maintaining an active data connection with the LTE network, see, e.g., 3GPP TS 36.300 V13.4.0 (June 2016), section 10.1.3, and 3GPP TS 36.331 V13.2.0 (June 2016), section 5.5. One specific measurement related to unlicensed band operation is channel occupancy measurements. The channel occupancy is defined as a percentage of measurement samples where the RSSI (Received Signal Strength Indicator) value is above a threshold. The channel occupancy value may for example be used to decide whether a certain frequency from an unlicensed frequency band should be used in the LAA technology.

However, in some scenarios the existing channel measurement mechanisms may be inadequate. For example, when considering utilization of frequencies from an unlicensed frequency band also without assistance of a control channel established in a licensed frequency band, e.g., when setting up a connection using exclusively frequencies from an unlicensed frequency band. Support of corresponding scenarios are for example being considered for the NR (New Radio) technology developed by 3GPP.

Accordingly, there is a need for techniques that allow for improved assessment of channel characteristics by measurements.

SUMMARY OF THE INVENTION

According to an embodiment, a method of controlling measurements in a wireless communication network is provided. According to the method, a wireless communication device, e.g., a UE, receives control information from the wireless communication network. The control information indicates at least a first measurement configuration for channel measurements to be applied in a first connection state of the wireless communication device and a second measurement configuration for channel measurements to be applied in a second connection state of the wireless communication device. If the wireless communication device is in the first connection state, the wireless communication device controls channel measurements by the wireless communication device according to the first measurement configuration. If the wireless communication device is in the second connection state, the wireless communication device controls channel measurements by the wireless communication device according to the second measurement configuration. Accordingly, the actually applied measurement configuration depends on the connection state of the wireless communication device. This allows for flexibly configuring how the wireless communication device shall perform the channel measurements in various connection states, including a connection state in which the wireless communication device has no active data connection to the wireless communication network, i.e., in an idle state. Further, applied measurement configuration can be automatically adapted when the wireless communication device changes its connection state.

In the first connection state the wireless communication device may at certain occasions have an active data connection to the wireless communication network, i.e., is in a connected state, while in the second connection state the wireless communication device may not have active data connection to the wireless communication network, e.g., in an idle state. However, it is noted that measurement configurations could also be indicated for various other combinations of two or more connection states. For example, in the first connection state an active data connection of the wireless communication device to the wireless communication network could be of a first type, while in the second connection state an active data connection of the wireless communication device to the wireless communication network is of a second type. Examples of such different types of connection states with an active data connection are a fully connected state, in which the active data connection is configured for full performance, and a connected idle state, in which the active data connection is maintained in a standby configuration. The different connection states may refer to different so-called RRC states in 3GPP, but may also refer to different operating modes within a certain RRC state.

According to an embodiment the channel measurements comprise channel occupancy measurements for determining a utilization metric of a specified range of radio frequency.

According to an embodiment, the wireless communication device performs the channel measurements according to the first measurement configuration or the second measurement configuration. Based on the performed channel measurements, the wireless communication device may then controlling a connection of the wireless communication device to the wireless communication network. For example, the wireless communication device may decide based on the channel measurements which frequency to use for establishing the connection or select a new frequency for the connection. This may be accomplished autonomously at the wireless communication device, e.g., also when the wireless communication device is in the idle state.

According to an embodiment, the wireless communication device receives at least a part of the control information in a control message transmitted via an active data connection to the wireless communication device, e.g., in a connected state. For example, at least a part of the control information could be received via a physical layer control channel and/or via a radio resource control (RRC) connection. In this way, the control information may be defined individually for the wireless communication device.

According to an embodiment, the wireless communication device receives at least a part of the control information in a message broadcasted by the wireless communication network, e.g., in broadcasted system information. In this way, the control information may be provided to the wireless communication device without requiring an active connection.

According to a further embodiment, a method of controlling measurements in a wireless communication network is provided. According to the method a node of the wireless communication network, e.g., a base station, transmits control information to a wireless communication device. The control information indicates at least a first measurement configuration for channel measurements to be applied in a first connection state of the wireless communication device and a second measurement configuration for channel measurements to be applied in a second connection state of the wireless communication device. Accordingly, the node may control the wireless communication device in such a way that the measurement configuration actually applied by the wireless communication device depends on the connection state of the wireless communication device. This allows for flexibly configuring how the wireless communication device shall perform the channel measurements in various connection states, including a connection state in which the wireless communication device has no active data connection to the wireless communication network, i.e., in an idle state. Further, applied measurement configuration can be automatically adapted when the wireless communication device changes its connection state.

According to an embodiment, the node receives at least one report of the channel measurements performed by the wireless communication device. Based on the report, the node may then control a connection of the wireless communication device to the wireless communication network. For example, the node may decide based on the channel measurements whether the wireless communication device should maintain the connection on a currently utilized frequency or if it should rather switch to some other frequency.

According to an embodiment the measurement configurations indicate measurement configurations for measurement of channel occupancy, i.e., measurement configurations for channel occupancy measurements.

According to an embodiment, the node transmits at least a part of the control information in a control message transmitted via an active data connection to the wireless communication device, e.g., in a connected state of the wireless communication device. For example, at least a part of the control information could be transmitted via a physical layer control channel and/or via a RRC connection. In this way, the control information may be defined individually for the wireless communication device.

According to an embodiment, the node transmits at least a part of the control information in a broadcasted message, e.g., in broadcasted system information. In this way, the control information may be provided to the wireless communication device without requiring an active connection of the wireless communication device.

According to a further embodiment, a wireless communication device is provided. The wireless communication device comprises a radio interface for connecting to a wireless communication network. Further, the wireless communication device comprises one or more processors configured to receive, via the radio interface, control information from the wireless communication network. The control information indicates at least a first measurement configuration for channel measurements to be applied in a first connection state of the wireless communication device and a second measurement configuration for channel measurements to be applied in a second connection state of the wireless communication device. Further, the one or more processors are configured to control channel measurements by the wireless communication device according to the first measurement configuration, if the wireless communication device is in the first connection state and to control channel measurements by the wireless communication device according to the second measurement configuration if the wireless communication device is in the second connection state. In particular, the one or more processors may be configured to perform or control the steps as performed by the wireless communication device in the above method.

According to an embodiment the measurement configurations received by the wireless communication device comprise of configuration information for channel occupancy measurements.

Accordingly, the one or more processors may be configured to control or perform the channel measurements according to the first measurement configuration or the second measurement configuration and, based on the performed channel measurements, control a connection of the wireless communication device to the wireless communication network. For example, the one or more processors may decide based on the channel measurements which frequency to use for establishing the connection or select a new frequency for the connection. This may be accomplished autonomously, e.g., also when the wireless communication device is in the idle state.

Further, the one or more processors may be configured to receive, via the radio interface, at least a part of the control information in a control message transmitted via an active data connection to the wireless communication device. Alternatively or in addition, the one or more processors may be configured to receive, via the radio interface, at least a part of the control information in a message broadcasted by the wireless communication network, e.g., in broadcasted system information.

According to a further embodiment, a node for a wireless network is provided, e.g., a base station. The node comprises an interface for controlling a wireless communication device, e.g., a UE. Further, the node comprises one or more processors configured to transmit control information via the interface to the wireless communication device. The control information indicates at least a first measurement configuration for channel measurements to be applied in a first connection state of the wireless communication device and a second measurement configuration for channel measurements to be applied in a second connection state of the wireless communication device. Accordingly, the node may control the wireless communication device in such a way that the measurement configuration actually applied by the wireless communication device depends on the connection state of the wireless communication device. This allows for flexibly configuring how the wireless communication device shall perform the channel measurements in various connection states, including a connection state in which the wireless communication device has no active data connection to the wireless communication network, i.e., in an idle state. Further, applied measurement configuration can be automatically adapted when the wireless communication device changes its connection state. In particular, the one or more processors may be configured to perform or control the steps as performed by the wireless communication device in the above method. If the node is a base station, the interface may correspond to a radio interface of the base station.

According to an embodiment, the control information indicated by the base station includes configuration information for channel occupancy measurements.

Accordingly, the one or more processors may be configured to receive, via the interface, at least one report of the channel measurements performed by the wireless communication device and, based on the report, control a connection of the wireless communication device to the wireless communication network. For example, the one or more processors may decide based on the channel measurements whether the wireless communication device should maintain the connection on a currently utilized frequency or if it should rather switch to some other frequency.

Further, the one or more processors may be configured to transmit, via the interface, at least a part of the control information in a control message transmitted via an active data connection to the wireless communication device. Alternatively or in addition, the one or more processors may be configured to transmit, via the radio interface, at least a part of the control information in a broadcasted message, e.g., in broadcasted system information.

According to a further embodiment, a system is provided. The system comprises at least one wireless communication device as described above and a node of the wireless communication network. The node is configured to transmit the control information to the at least one wireless communication device. In this system, the at least one wireless communication device and the node may be configured to operate according to the above methods.

According to embodiments of the above methods, wireless communication device, node or system, the first measurement configuration defines a first frequency range in which the channel measurements are to be performed when the wireless communication device is in the first connection state, and the second measurement configuration defines a second frequency range in which the channel measurements are to be performed when the wireless communication device is in the second connection state. Accordingly, depending on the connection state of the wireless communication device the channel measurements may be performed in different frequency ranges. For example, when the wireless communication device is in the idle state, a wider frequency range could be utilized than when the wireless communication device is in a connection state where it has an active data connection to the wireless communication network, i.e., is in a connected state. In this way, a wider frequency range may be considered before setting up the connection.

According to embodiments of the above methods, wireless communication device, node or system, the first measurement configuration defines a first frequency grid defining frequencies on which the channel measurements are to be performed when the wireless communication device is in the first connection state, and the second measurement configuration defines a second frequency grid defining frequencies on which the channel measurements are to be performed when the wireless communication device is in the second connection state. In this way, it can be efficiently taken into account that the spacing of frequencies which may be used by the wireless communication device can vary, e.g., depending on the considered frequency range.

According to embodiments of the above methods, wireless communication device, node or system, the first measurement configuration defines at least one first measurement trigger for triggering the channel measurements when the wireless communication device is in the first connection state, and the second measurement configuration defines at least one second measurement trigger for triggering the channel measurements when the wireless communication device is in the second connection state. In this way, it can be efficiently taken into account that in different connection states the channel occupancy measurements may be needed at different occasions. For example, in the idle state, the channel measurements could be triggered by a need to establish an active data connection. In a connected state, the channel measurements could for example be triggered based on a criterion related to the quality of the current active connection, e.g., in response to the quality dropping below a threshold, or a number of failed attempts to gain access to a frequency used for the current active connection, e.g., a number of failed listen-before-talk (LBT) procedures.

According to embodiments of the above methods, wireless communication device, node or system, the first measurement configuration defines at least one first reporting trigger for triggering reporting of the channel measurements when the wireless communication device is in the first connection state, and the second measurement configuration defines at least one second reporting trigger for triggering reporting of the channel measurements when the wireless communication device is in the second connection state. In this way, it can be efficiently taken into account that in depending on the connection state the need of the wireless communication network for reports of the channel measurements may vary. For example, in the idle state reports of the channel measurements may be needed only on rare occasions, e.g., when the wireless communication device moves to another coverage area of the wireless communication network. In this way, it can be efficiently taken into account that in depending on the connection state the need for the channel measurements may vary.

According to embodiments of the above methods, wireless communication device, node or system, the first measurement configuration defines a first timing for the channel measurements when the wireless communication device is in the first connection state and the second measurement configuration defines a second timing for the channel measurements when the wireless communication device is in the second connection state. The first and second timings may for example be defined in terms of a periodic pattern.

For example, in the idle state, the channel measurements may be performed less frequently than in a connected state.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of measurements in a wireless communication network, in particular to control of channel measurements performed by a wireless communication device for assessing characteristics of a radio channel. In the examples as illustrated in the following, the wireless communication device is assumed to be a UE. The wireless communication network may for example be based on the LTE radio technology or NR technology. The channel measurements may then for example be performed with respect to frequencies from an unlicensed frequency band, e.g., to be used as additional carriers in an LAA scenario. Further, such frequencies could also be used as stand-alone carriers in scenarios without assistance of a control channel established on a frequency from a licensed frequency band. However, it is noted that the channel measurements may also be performed in other frequency ranges, without limitation to unlicensed frequency bands. For example, such channel measurements could also be useful in scenarios where a certain frequency range from a licensed frequency band is shared within the wireless communication network on the basis of a contention based mechanism. For example, the channel measurements may be used to quantify the specified frequency range in a way that assists selection of a frequency or radio channel, without limitation to a certain type of channel selection procedure.

Figure 1:
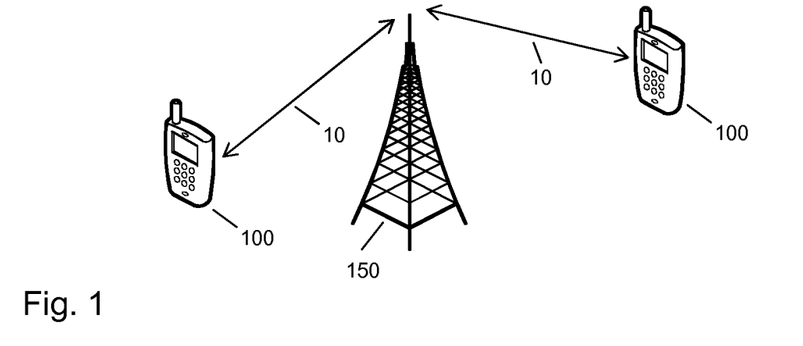
FIG. 1 schematically illustrates a wireless communication network system according to an embodiment of the invention.

FIG. 1 schematically illustrates an exemplary scenario in which the channel measurements may be controlled and utilized in accordance with the concepts as illustrated herein. In particular, FIG. 1 shows UEs 100 and a base station 150 of the wireless communication network. The UEs 100 may for example correspond to mobile phones, smartphones, tablet computers, or other portable communication devices. However, it is noted that the illustrated concepts may also be applied to other kinds of UEs or wireless communication devices, such as MTC (machine type communication) devices.

As further illustrated, each UE 100 may establish a connection 10 to the wireless communication network. In the illustrated example, this connection is assumed to be established via the base station 150. Accordingly, the connection 10 may be controlled by the base station 150, e.g., with respect to establishment, maintenance, release, and/or allocation of radio resources. As mentioned above, at least one frequency used as signal carrier for the connection may be selected from an unlicensed frequency band. Further, the base station 150 is assumed to control the UEs 100 with respect to channel measurements performed by the UEs 100. For this purpose, the base station 150 provides control information to the UEs 100. The control information indicates measurement configuration is to be applied by the UEs 100 for the channel measurements. In particular, the control information indicates different measurement configurations to be applied depending on a connection state of the UE 100. These connection states may for example include a state, in which the UE 100 has no active data connection to the wireless communication network, e.g., an idle state. Further, these connection states may include one or more states, in which the UE 100 has an active data connection to the wireless communication network. Such a state may also be denoted a connected state. In some scenarios, different types of connected or idle states may be provided. These may for example differ with respect to a performance level configuration of the active data connection. For example, such different types of states could include a fully connected state, in which the active data connection is configured for full performance, and a connected idle state, in which the active data connection is maintained in a standby configuration.

The measurement configurations for the different connection states may for example differ with respect to a frequency range in which the channel measurements are to be performed, a frequency grid defining frequencies on which the channel measurements are to be performed, a timing according to which the channel measurements are to be performed, measurement triggers for triggering the channel measurements at the UE 100, and/or reporting triggers for triggering reporting of the channel measurements by the UE 100.

The base station 150 may transmit the control information in a dedicated control message to the UE 100, i.e., a control message individually addressed to the UE 100. In addition or as an alternative, the base station 150 may also transmit the control information in a broadcast message, e.g., in broadcasted system information, such as in an SIB (System Information Block) as specified for the LTE radio technology.

The channel measurements may include channel occupancy measurements, channel quality measurements, channel strength measurements, or combinations of different channel measurements.

The channel occupancy may be defined as an indicator of radio utilization of a certain frequency or frequency range. Without limitation, measured parameters for determining the channel occupancy may include a percentage of measurement samples of RSSI or another signal strength indicator, where the signal strength as measured by the UE is above a threshold. However, rather than using a signal strength indicator, also an indicator of interference level could be utilized. The channel occupancy may thus be determined as a measure of a contribution of signals from usage of the frequency or frequency range by other radio systems, e.g., other radio technologies or other wireless communication networks.

The channel occupancy value may for example be used to decide whether a certain frequency should be used for a connection of the UE to the wireless communication network. The channel occupancy measurements may be utilized locally at the UE and/or maybe reported to the wireless communication network. In each case, they for example be utilized as a basis for selecting one or more frequencies as carriers for the connection of the UE to the wireless communication network. This may involve initial connection set up, e.g., when the UE changes from idle mode to connected mode and establishes an active data connection. Further, this may also involve selection of other frequencies while maintaining an active connection. Reasons to select another frequency may for example be a poor radio channel quality with the currently used frequency or frequencies, e.g., due excessive losses of the radio channel itself and/or due to interference caused by other devices using the same frequency.

Figure 2:
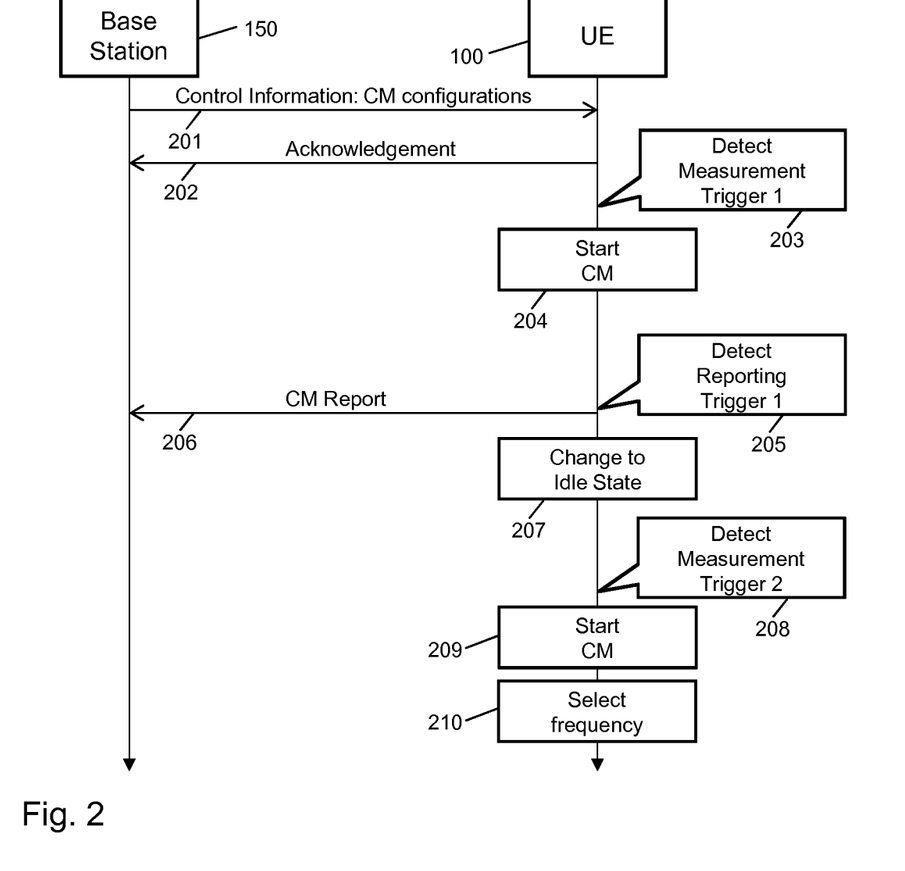
FIG. 2 shows an example of processes according to an embodiment of the invention.

FIG. 2 shows an example of processes which are based on the concepts as outlined above. The processes of FIG. 2 involve the base station 150 and one of the UEs 100.

As illustrated, the base station 150 transmits control information 201 to the UE 100. The control information 201 indicates multiple channel measurement (CM) configurations. Each of these different CM configurations is to be applied in a corresponding connection state of the UE 100. In the example of FIG. 2, it is assumed that one CM measurement configurations is to be applied in a connected state of the UE 100 and another CM measurement configuration is to be applied in the idle state of the UE 100. As further illustrated, the UE 100 may respond to the base station 150 by sending an acknowledgement 202 confirming that the UE 100 will apply the indicated CM measurement configurations. It is noted that in some scenarios, the acknowledgement 202 may be permitted. For example, if only broadcasted system information is used for conveying the control information 201, sending of the acknowledgement 202 may be omitted when the UE 100 has no active data connection.

Assuming that the UE 100 is first in the connected state, it will then apply the CM measurement configuration indicated for the connected state. In the illustrated example, it is assumed that the CM and measurement configuration for the connected state defines a measurement trigger (measurement trigger 1). Before detecting the measurement trigger, the UE 100 will not perform the channel measurements. The measurement trigger may for example be based on channel quality as measured for the existing connection 10 of the UE 100 to the wireless communication network. The channel quality may for example be measured in terms of received signal strength, RSSI, signal to noise ratio, or the like. In addition or as an alternative, the measurement trigger could be based on channel access related parameters such as number of failed LBT procedures for gaining access to a frequency used for the existing connection.

It is noted that channel quality may typically be measured in any connection state of the UE 100. For example, channel quality measurements may also be required to be performed regularly by the UE 100 for purposes of cell selection/reselection. As compared to that, channel access related parameters would typically be measured or detected in the connected state, because normally there will be no channel access attempts in the idle state. This may also be taken into account by the different CM measurement configurations indicated to the UE 100.

In the example of FIG. 2, it is assumed that the measurement trigger is detected at 203 and, in response to detecting the measurement trigger, the UE 100 then starts the channel measurements at 204.

In the illustrated example, it is further assumed that the CM and measurement configuration for the connected state defines a reporting trigger (reporting trigger 1). Before detecting the reporting trigger, the UE 100 will thus not report the channel measurements it performed. The reporting trigger may for example be based on the channel measurement itself, e.g., on a measured value. For example, the measurement configuration could indicate a threshold, and reporting of the channel measurements could be triggered by the measured value exceeding the threshold. Search threshold could also be defined in a frequency selective manner. For example, exceeding the threshold in one frequency range could trigger reporting of the channel measurements for some other frequency range. The reporting trigger may for example also require that the specified threshold is exceeded for a minimum amount of time. Other possible reporting triggers may for example include mobility events, such as change to another coverage area.

In the example of FIG. 2, it is assumed that the reporting trigger is detected at 205 and, in response to detecting the reporting trigger, the UE 100 then sends a CM report 206 indicating at least some of the channel occupancy measurements performed by the UE 100. The measurement configuration may also define which part of the channel measurements performed by the UE is to be reported.

As illustrated by 207, it is further assumed that the UE 100 then changes to the idle state. For example, this may be due to the UE 100 switching to a low power mode and no longer requiring an active data connection. In response to changing to the idle state, the UE 100 applies the CM measurement configuration indicated for the idle state for controlling the channel occupancy measurements. In the illustrated example, it is assumed that the CM measurement configuration for the idle state defines another measurement trigger (measurement trigger 2) and another reporting trigger (reporting trigger 2) than the CM configuration for the connected state. The measurement trigger and reporting trigger defined for the idle state may be of the same types as mentioned above in connection with the connected state.

In the example of FIG. 2, it is assumed that the measurement trigger defined for the idle state is detected at 208 and, in response to detecting the measurement trigger, the UE 100 then starts the channel measurements at 209. Further, it is assumed that before detecting the reporting trigger, the UE 100 already locally utilizes the performed channel occupancy measurements for selecting one or more frequencies, as indicated by 210. These frequencies may differ from the frequencies used before in the connected state. For example, if the channel measurements include measurement of channel occupancy, the UE 100 may select another frequency which is found to have a lower channel occupancy than a previously used frequency. Similar rules based on comparison of measured values may be defined for other types of channel measurements.

Figure 3:
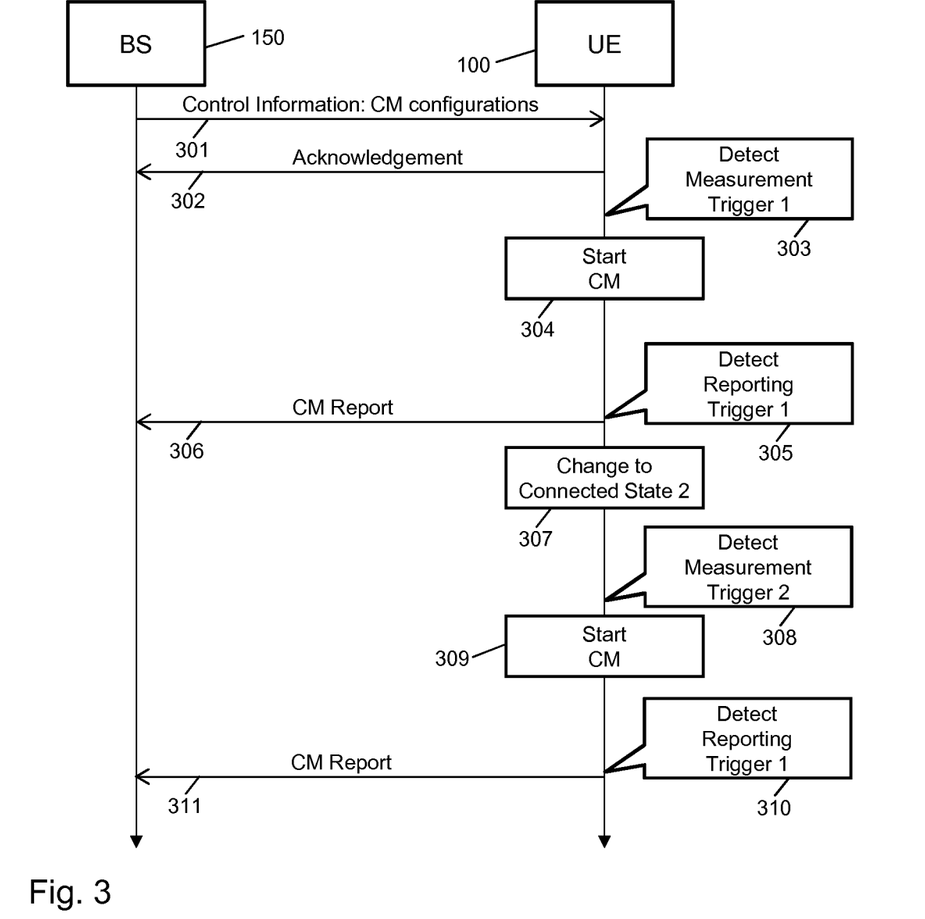
FIG. 3 shows a further example of processes according to an embodiment of the invention.

FIG. 3 shows an example of processes which are based on the concepts as outlined above. The processes of FIG. 2 involve the base station 150 and one of the UEs 100.

As illustrated, the base station 150 transmits control information 301 to the UE 100. The control information 301 indicates multiple CM configurations.

Each of these different CM configurations is to be applied in a corresponding connection state of the UE 100. In the example of FIG. 3, it is assumed that one CM measurement configurations is to be applied in a first connected state of the UE 100 and another CM measurement configuration is to be applied in a second state of the UE 100. The first and second connected states are assumed to be of different types. For example, the first connected state may correspond to the above-mentioned fully connected state while the second state may correspond to the above-mentioned connected idle state. As further illustrated, the UE 100 may respond to the base station 150 by sending an acknowledgement 302 confirming that the UE 100 will apply the indicated CM measurement configurations. It is noted that in some scenarios, the acknowledgement 302 may be permitted. For example, if only broadcasted system information is used for conveying the control information 301, sending of the acknowledgement 302 may be omitted when the UE 100 has no active data connection.

Assuming that the UE 100 is initially in the first connected state, it will then apply the CM measurement configuration indicated for the first connected state. In the illustrated example, it is assumed that the CM and measurement configuration for the first connected state defines a measurement trigger (measurement trigger 1). Before detecting the measurement trigger, the UE 100 will not perform the channel measurements. The measurement trigger may for example be based on channel quality as measured for the existing connection 10 of the UE 100 to the wireless communication network. The channel quality may for example be measured in terms of received signal strength, RSSI, signal to noise ratio, or the like. In addition or as an alternative, the measurement trigger could be based on channel access related parameters such as number of failed LBT procedures for gaining access to a frequency used for the existing connection.

In the example of FIG. 3, it is assumed that the measurement trigger is detected at 303 and, in response to detecting the measurement trigger, the UE 100 then starts the channel measurements at 304.

In the illustrated example, it is further assumed that the CM and measurement configuration for the first connected state defines a reporting trigger (reporting trigger 1). Before detecting the reporting trigger, the UE 100 will thus not report the channel measurements it performed. The reporting trigger may for example be based on the value of the measured channel itself. For example, the measurement configuration could indicate a measured channel threshold, and reporting of the measured channel could be triggered by the measured channel exceeding the threshold. Search threshold could also be defined in a frequency selective manner. For example, exceeding the threshold in one frequency range could trigger reporting of the channel measurements for some other frequency range. The reporting trigger may for example also require that the specified threshold is exceeded for a minimum amount of time. Other possible reporting triggers may for example include mobility events, such as change to another coverage area.

In the example of FIG. 3, it is assumed that the reporting trigger is detected at 305 and, in response to detecting the reporting trigger, the UE 100 then sends a CM report 306 indicating at least some of the channel measurements performed by the UE 100. The measurement configuration may also define which part of the channel measurements performed by the UE is to be reported.

As illustrated by 307, it is further assumed that the UE 100 then changes to the second connected state. For example, this may be due to the UE 100 temporarily having no data to transmit. In response to changing to the second connected state, the UE 100 applies the CM measurement configuration indicated for the second connected state for controlling the channel measurements. In the illustrated example, it is assumed that the CM measurement configuration for the second connected state defines another measurement trigger (measurement trigger 2) and another reporting trigger (reporting trigger 2) than the CM configuration for the first connected state. The measurement trigger and reporting trigger defined for the second connected state may be of the same types as mentioned above in connection with the first connected state, but may have the effect that the channel measurements are triggered less frequency and/or that reporting of the channel measurements is triggered less frequently.

In the example of FIG. 3, it is assumed that the measurement trigger defined for the second connected state is detected at 308 and, in response to detecting the measurement trigger, the UE 100 then starts the channel measurements at 309. Further, it is assumed that the reporting trigger defined for the second connected state is detected at 310 and, in response to detecting the reporting trigger, the UE 100 then sends a CM report 311 indicating at least some of the channel measurements performed by the UE 100 in the second connected state. The base station 150 may then utilize the performed channel measurements for controlling the active connection of the UE 100 to the wireless communication network, e.g., by selecting frequencies. These frequencies may differ from the frequencies currently used for the active connection. For example, the base station 150 may select another frequency which is found to have a lower channel than a previously used frequency. The base station 150 may then inform the UE 100 to switch to the newly selected frequency for frequencies.

Figure 4:
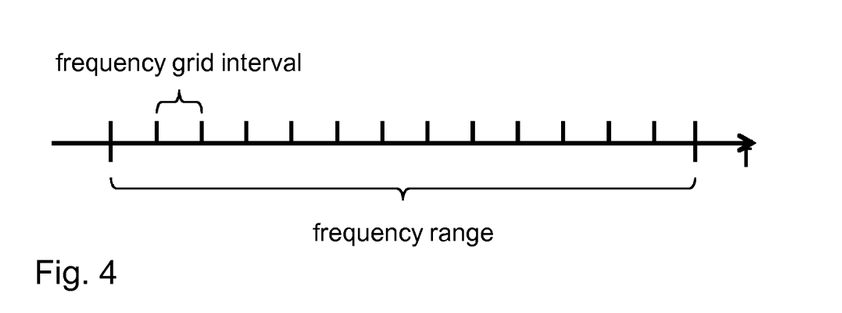
FIG. 4 schematically illustrates a frequency range and a frequency grid of a measurement configuration according to an embodiment of the invention.

As mentioned above, the measurement configurations for the channel measurements may also indicate a frequency range and/or frequency grid according to which the channel measurements are to be performed by the UE 100. An example of how such frequency range and frequency grid could be defined is illustrated in FIG. 4. The frequency range may for example be indicated by a frequency band indication, e.g., using a band numbering as for example specified in 3GPP TS 36.101. However, other numbering schemes where each frequency band has a unique band number could be utilized as well. In addition or as an alternative, a frequency range may also be indicated by specifying an upper or lower limit of the frequency range or a width of the frequency range. Within the frequency range, the frequency grid may be specified by defining a grid spacing, e.g., in terms of a channel raster or frequency difference between neighboring grid positions. In some scenarios, a frequency range and/or frequency grid may also be defined in terms of a default configuration to be applied if the control information specifies no other frequency range of frequency grid. For example, such the Ford frequency range or frequency grid could be defined by a telecommunications standard.

Figure 5:
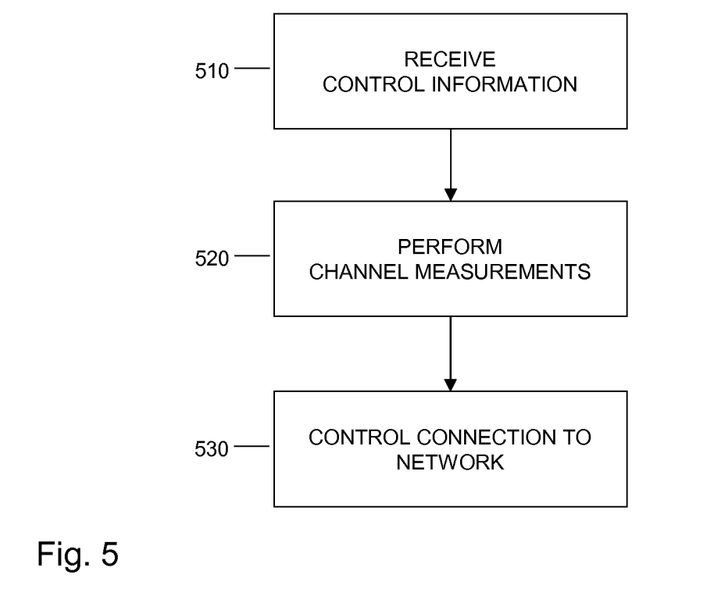
FIG. 5 shows a flowchart for illustrating a method according to an embodiment of the invention.

FIG. 5 shows a flowchart illustrating a method of controlling measurements in a wireless communication network, by which a wireless communication device, e.g., the above-mentioned UE 100, may implement concepts as described above. If a processor based implementation of the wireless communication device is utilized, at least a part of the steps of the method may be performed and/or controlled by one or more processors of the wireless communication device.

At step 510, the wireless communication device receives control information. The wireless communication device may receive the control information in a broadcast message, e.g., in broadcasted system information.

The control information indicates at least a first measurement configuration for channel measurements to be applied in a first connection state of the wireless communication device and a second measurement configuration for channel measurements to be applied in a second connection state of the wireless communication device.

The channel measurements may include channel occupancy measurements. Alternatively or in addition, other the channel measurements could also include other types of channel measurements, e.g., channel quality measurements, signal strength measurements, or combinations of the above types of channel measurements.

The first measurement configuration may define a first frequency range in which the channel measurements are to be performed when the wireless communication device is in the first connection state, while the second measurement configuration defines a second frequency range in which the channel measurements are to be performed when the wireless communication device is in the second connection state. Accordingly, depending on the connection state of the wireless communication device the channel measurements may be performed in different frequency ranges. For example, when the wireless communication device is in the idle state, a wider frequency range could be utilized than when the wireless communication device is in a connection state where it has an active data connection to the wireless communication network, i.e., is in a connected state.

In addition or as an alternative, the first measurement configuration may define a first frequency grid defining frequencies on which the channel measurements are to be performed when the wireless communication device is in the first connection state, while the second measurement configuration defines a second frequency grid defining frequencies on which the channel measurements are to be performed when the wireless communication device is in the second connection state.

In addition or as an alternative, the first measurement configuration may define at least one first measurement trigger for triggering the channel measurements when the wireless communication device is in the first connection state, and the second measurement configuration defines at least one second measurement trigger for triggering the channel measurements when the wireless communication device is in the second connection state. For example, in the idle state, the channel measurements could be triggered by a need to establish an active data connection. In a connected state, the channel measurements could for example be triggered based on a criterion related to the quality of the current active connection, e.g., in response to the quality dropping below a threshold, or a number of failed attempts to gain access to a frequency used for the current active connection, e.g., a number of failed LBT procedures.

In addition or as an alternative, the first measurement configuration may define at least one first reporting trigger for triggering reporting of the channel measurements when the wireless communication device is in the first connection state, and the second measurement configuration defines at least one second reporting trigger for triggering reporting of the channel measurements when the wireless communication device is in the second connection state. For example, in the idle state reports of the channel measurements could be triggered only on rare occasions, e.g., when the wireless communication device moves to another coverage area of the wireless communication network.

In addition or as an alternative, the first measurement configuration may define a first timing for the channel measurements when the wireless communication device is in the first connection state and the second measurement configuration defines a second timing for the channel measurements when the wireless communication device is in the second connection state. The first and second timings may for example be defined in terms of a periodic pattern. For example, in the idle state, the channel measurements may be performed less frequently than in a connected state.

At step 520, the wireless communication device may perform channel measurements based on the first measurement configuration or the second measurement configuration indicated at step 510. If the wireless communication device is in the first connection state, the wireless communication device controls channel measurements by the wireless communication device according to the first measurement configuration. If the wireless communication device is in the second connection state, the wireless communication device controls channel measurements by the wireless communication device according to the second measurement configuration. Accordingly, the actually applied measurement configuration depends on the connection state of the wireless communication device.

At step 530, the wireless communication device may control its connection to the wireless communication network. This may be accomplished on the basis of the channel measurements as performed at step 520. For example, the wireless communication device may decide based on the channel measurements which frequency to use for establishing the connection or select a new frequency for the connection. This may be accomplished autonomously at the wireless communication device, e.g., also when the wireless communication device is in the idle state.

Figure 6:
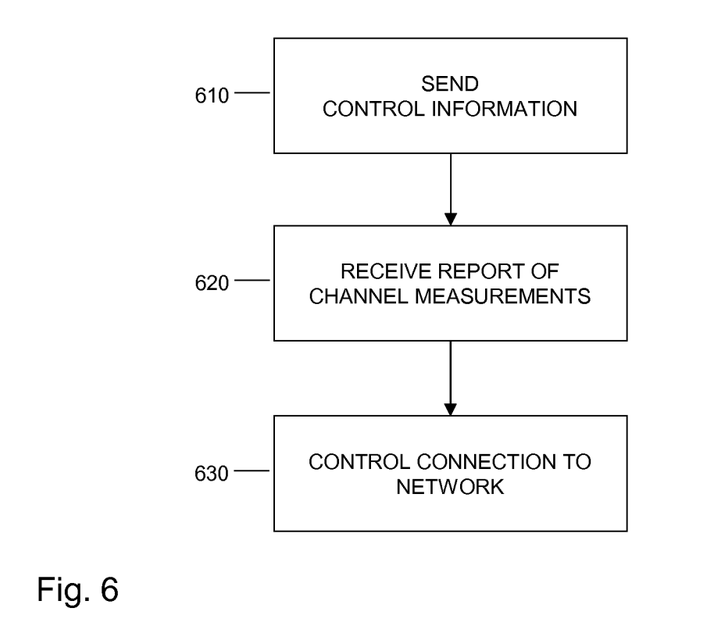
FIG. 6 shows a flowchart for illustrating a further method according to an embodiment of the invention.

FIG. 6 shows a flowchart illustrating a method of controlling measurements in a wireless communication network, by which a node of the wireless communication network, e.g., the above-mentioned base station 150, may implement concepts as described above. If a processor based implementation of the node is utilized, at least a part of the steps of the method may be performed and/or controlled by one or more processors of the node.

At step 610, the node sends control information to a wireless communication device, e.g., to the above-mentioned UE 100. The node may send the control information in a broadcast message, e.g., in broadcasted system information.

The control information indicates at least a first measurement configuration for channel measurements to be applied in a first connection state of the wireless communication device and a second measurement configuration for channel measurements to be applied in a second connection state of the wireless communication device.

The channel measurements may include channel occupancy measurements. Alternatively or in addition, other the channel measurements could also include other types of channel measurements, e.g., channel quality measurements, signal strength measurements, or combinations of the above types of channel measurements.

The first measurement configuration may define a first frequency range in which the channel measurements are to be performed when the wireless communication device is in the first connection state, while the second measurement configuration defines a second frequency range in which the channel measurements are to be performed when the wireless communication device is in the second connection state. Accordingly, depending on the connection state of the wireless communication device the channel measurements may be performed in different frequency ranges. For example, when the wireless communication device is in the idle state, a wider frequency range could be utilized than when the wireless communication device is in a connection state where it has an active data connection to the wireless communication network, i.e., is in a connected state.

In addition or as an alternative, the first measurement configuration may define a first frequency grid defining frequencies on which the channel measurements are to be performed when the wireless communication device is in the first connection state, while the second measurement configuration defines a second frequency grid defining frequencies on which the channel measurements are to be performed when the wireless communication device is in the second connection state.

In addition or as an alternative, the first measurement configuration may define at least one first measurement trigger for triggering the channel measurements when the wireless communication device is in the first connection state, and the second measurement configuration defines at least one second measurement trigger for triggering the channel measurements when the wireless communication device is in the second connection state. For example, in the idle state, the channel measurements could be triggered by a need to establish an active data connection. In a connected state, the channel measurements could for example be triggered based on a criterion related to the quality of the current active connection, e.g., in response to the quality dropping below a threshold, or a number of failed attempts to gain access to a frequency used for the current active connection, e.g., a number of failed LBT procedures.

In addition or as an alternative, the first measurement configuration may define at least one first reporting trigger for triggering reporting of the channel measurements when the wireless communication device is in the first connection state, and the second measurement configuration defines at least one second reporting trigger for triggering reporting of the channel measurements when the wireless communication device is in the second connection state. For example, in the idle state reports of the channel measurements could be triggered only on rare occasions, e.g., when the wireless communication device moves to another coverage area of the wireless communication network.

In addition or as an alternative, the first measurement configuration may define a first timing for the channel measurements when the wireless communication device is in the first connection state and the second measurement configuration defines a second timing for the channel measurements when the wireless communication device is in the second connection state. The first and second timings may for example be defined in terms of a periodic pattern. For example, in the idle state, the channel measurements may be performed less frequently than in a connected state.

At step 620, the node may receive a report of the channel measurements performed by the wireless communication device based on the first measurement configuration or the second measurement configuration indicated at step 610. The report may be triggered by a reporting trigger defined in the first measurement configuration of the second measurement configuration.

At step 630, the node may control a connection of the wireless communication device to the wireless communication network. This may be accomplished on the basis of the reported channel measurements from step 620. For example, the node may select a new frequency for the connection.

Figure 7:
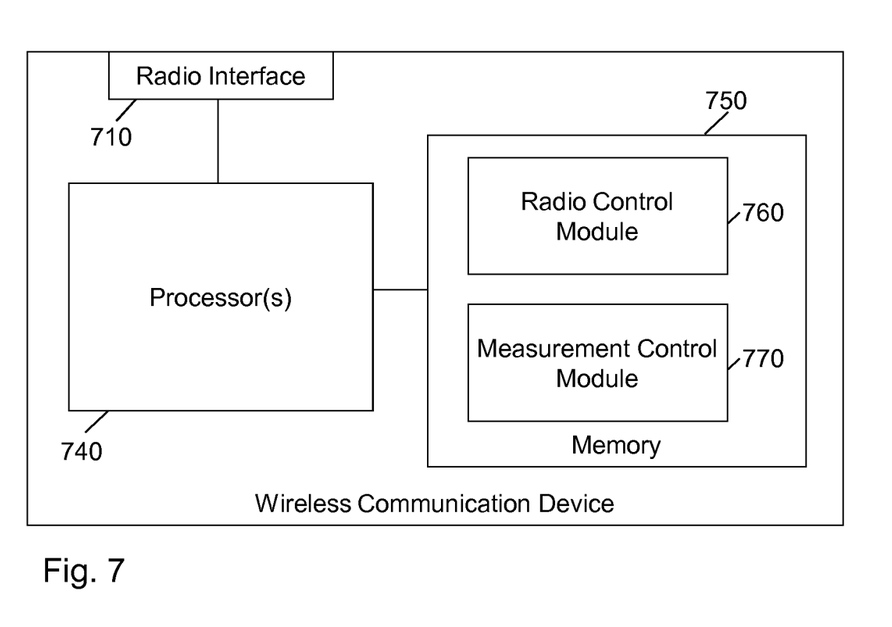
FIG. 7 schematically illustrates a processor-based implementation of a wireless communication device according to an embodiment of the invention.

FIG. 7 shows a block diagram for schematically illustrating a processor based implementation of a wireless communication device which may be utilized for implementing the above concepts. The wireless communication device may for example correspond to a UE, such as above-mentioned UE 100.

As illustrated, the wireless communication device includes a radio interface 710. The wireless communication device may utilize the radio interface 710 for connecting to a wireless communication network, e.g., through a base station of the wireless communication network, such as the base station 150. Further, the wireless communication device may utilize the radio interface 710 for performing measurements, in particular channel the abovementioned measurements.

Further, the wireless communication device is provided with one or more processors 740 and a memory 750. The radio interface 710, and the memory 750 are coupled to the processor(s) 740, e.g., using one or more internal bus systems of the wireless communication device.

The memory 750 includes program code modules 760, 770 with program code to be executed by the processor(s) 740. In the illustrated example, these program code modules include a radio control module 760 and a measurement control module 770.

The radio control module 760 may implement and control the above-described functionalities of establishing, maintaining, releasing, and utilizing a connection to the wireless communication network. The measurement control module 770 may implement the above-described functionalities of controlling channel measurements based on the indicated measurement configurations.

It is to be understood that the structures as illustrated in FIG. 7 are merely exemplary and that the wireless communication device may also include other elements which have not been illustrated, e.g., structures or program code modules for implementing known functionalities of a UE or other type of wireless communication device.

Figure 8:
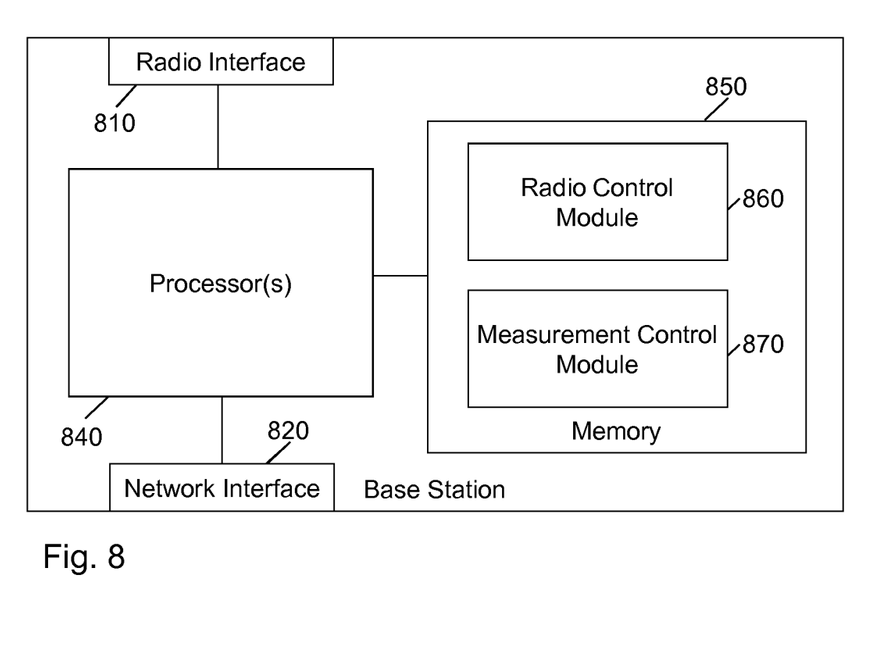
FIG. 8 schematically illustrates a processor-based implementation of a network node according to an embodiment of the invention.

FIG. 8 shows a block diagram for schematically illustrating a processor based implementation of node of a wireless communication network which may be utilized for implementing the above concepts. In the example of FIG. 8, the node is assumed to be implemented as a base station of the wireless communication network, e.g. corresponding to the above-mentioned base station 150.

As illustrated, the base station includes an radio interface 810. The base station may utilize the radio interface 810 for controlling one or more wireless communication devices, such as the above-mentioned UEs 100. As further illustrated, the base station may be provided with a network interface 820, which may be used for connecting to other nodes of the wireless communication network, e.g., to other base stations or two core network nodes.

Further, the base station is provided with one or more processors 840 and a memory 850. The radio interface 810, and the memory 850 are coupled to the processor(s) 840, e.g., using one or more internal bus systems of the base station.

The memory 850 includes program code modules 860, 870 with program code to be executed by the processor(s) 840. In the illustrated example, these program code modules include a radio control module 860, and a measurement management module 870.

The radio control module 860 may implement and control the above-described functionalities of establishing, maintaining, releasing, and utilizing a connection to the wireless communication device. The measurement control module 870 may implement the above-described functionalities of controlling indicating measurement configurations for channel measurements.

It is to be understood that the structures as illustrated in FIG. 8 are merely exemplary and that the base station may also include other elements which have not been illustrated, e.g., structures or program code modules for implementing known functionalities of a base station or other network node.

It is to be understood that the concepts as explained above are susceptible to various modifications. For example, the concepts could be applied in connection with various kinds of radio technologies and radio devices, without limitation the LTE radio technology or NR technology. Further, it is noted that the concepts may be applied with respect to various types of channel measurements, without limitation to the above-mentioned examples, and that the channel measurements may be used for various purposes.

The invention claimed is:

1. A method of controlling measurements in a wireless communication network, the method comprising:
 a wireless communication device receiving control information from the wireless communication network, the control information indicating at least a first measurement configuration for channel measurements to be applied in a first connection state of the wireless communication device and a second measurement configuration for the channel measurements to be applied in a second connection state of the wireless communication device;
 responsive to the wireless communication device being in the first connection state, the wireless communication device controlling the channel measurements according to the first measurement configuration; and
 responsive to the wireless communication device being in the second connection state, the wireless communication device controlling the channel measurements according to the second measurement configuration,
 wherein both the first connection state and the second connection state comprise states during which a radio connection is established.

2. The method according to claim 1, further comprising:
 the wireless communication device performing the channel measurements according to the first measurement configuration or the second measurement configuration; and
 based on the channel measurements that were performed, the wireless communication device controlling a connection of the wireless communication device to the wireless communication network.

3. The method according to claim 1,
 wherein the first measurement configuration defines a first frequency range in which the channel measurements are to be performed when the wireless communication device is in the first connection state, and
 wherein the second measurement configuration defines a second frequency range in which the channel measurements are to be performed when the wireless communication device is in the second connection state.

4. The method according to claim 1,
 wherein the first measurement configuration defines a first frequency grid defining frequencies on which the channel measurements are to be performed when the wireless communication device is in the first connection state, and
 wherein the second measurement configuration defines a second frequency grid defining frequencies on which the channel measurements are to be performed when the wireless communication device is in the second connection state.

5. The method according to claim 1,
 wherein the first measurement configuration defines at least one first measurement trigger for triggering the channel measurements when the wireless communication device is in the first connection state, and
 wherein the second measurement configuration defines at least one second measurement trigger for triggering the channel measurements when the wireless communication device is in the second connection state.

6. The method according to claim 1,
 wherein the first measurement configuration defines a first timing for the channel measurements when the wireless communication device is in the first connection state, and
 wherein the second measurement configuration defines a second timing for the channel measurements when the wireless communication device is in the second connection state.

7. The method according to claim 1,
 wherein in the first connection state, the wireless communication device has an active data connection to the wireless communication network; and
 wherein in the second connection state, the wireless communication device has no active data connection to the wireless communication network.

8. The method according to claim 1,
 wherein in the first connection state, an active data connection of the wireless communication device to the wireless communication network is of a first type; and
 wherein in the second connection state, an active data connection of the wireless communication device to the wireless communication network is of a second type.

9. The method according to claim 1,
 wherein the wireless communication device receives at least a part of the control information in a control message transmitted via an active data connection to the wireless communication device.

10. The method according to claim 1,
 wherein the wireless communication device receives at least a part of the control information in a message broadcasted by the wireless communication network.

11. The method according to claim 1,
 wherein the channel measurements comprise channel occupancy measurements that indicate a radio utilization of a frequency or a range of radio frequencies.

12. The method according to claim 1, further comprising:
 reporting the channel measurements responsive to a first reporting trigger; and
 reporting the channel measurements responsive to a second reporting trigger,
 wherein, the channel measurements are not reported before detecting the first reporting trigger or the second reporting trigger.

13. A method of controlling measurements in a wireless communication network, the method comprising:
 a node of the wireless communication network transmitting control information to a wireless communication device, the control information indicating at least a first measurement configuration for channel measurements to be applied in a first connection state of the wireless communication device and a second measurement configuration for channel measurements to be applied in a second connection state of the wireless communication device,
 wherein in the first connection state, an active data connection of the wireless communication device to the wireless communication network is of a first type, wherein in the second connection state, an active data connection of the wireless communication device to the wireless communication network is of a second type, and wherein both the first connection state and the second connection state comprise states during which a radio connection is established.

14. The method according to claim 13, comprising:
the node receiving at least one report of the channel measurements performed by the wireless communication device; and
based on the report, the node controlling a connection of the wireless communication device to the wireless communication network.

15. The method according to claim 13,
wherein the first measurement configuration defines a first frequency range in which the channel measurements are to be performed when the wireless communication device is in the first connection state, and
wherein the second measurement configuration defines a second frequency range in which the channel measurements are to be performed when the wireless communication device is in the second connection state.

16. The method according to claim 13,
wherein the first measurement configuration defines a first frequency grid defining frequencies on which the channel measurements are to be performed when the wireless communication device is in the first connection state, and
wherein the second measurement configuration defines a second frequency grid defining frequencies on which the channel measurements are to be performed when the wireless communication device is in the second connection state.

17. The method according to claim 13,
wherein the first measurement configuration defines at least one first measurement trigger for triggering the channel measurements when the wireless communication device is in the first connection state, and
wherein the second measurement configuration defines at least one second measurement trigger for triggering the channel measurements when the wireless communication device is in the second connection state.

18. The method according to claim 13,
wherein the first measurement configuration defines at least one first reporting trigger for triggering reporting of the channel measurements when the wireless communication device is in the first connection state, and
wherein the second measurement configuration defines at least one second reporting trigger for triggering reporting of the channel measurements when the wireless communication device is in the second connection state.

19. The method according to claim 13,
wherein the first measurement configuration defines a first timing for the channel measurements when the wireless communication device is in the first connection state, and
wherein the second measurement configuration defines a second timing for the channel measurements when the wireless communication device is in the second connection state.

20. The method according to claim 13,
wherein in the first connection state, the wireless communication device has an active data connection to the wireless communication network; and wherein in the second connection state, the wireless communication device has no active data connection to the wireless communication network.

21. The method according claim 12,
wherein the node transmits at least a part of the control information in a control message transmitted via an active data connection to the wireless communication device.

22. The method according to claim 13,
wherein the node transmits at least a part of the control information in a broadcasted message.

23. The method according to claim 13,
wherein the channel measurements comprise channel occupancy measurements.

24. A wireless communication device, comprising:
a radio interface configured to connect to a wireless communication network; and one or more processors configured to:
receive, via the radio interface, control information from the wireless communication network, the control information indicating at least a first measurement configuration for channel measurements to be applied in a first connection state of the wireless communication device and a second measurement configuration for the channel measurements to be applied in a second connection state of the wireless communication device;
responsive to the wireless communication device being in the first connection state, control the channel measurements by the wireless communication device according to the first measurement configuration;
report the channel measurements responsive to a first reporting trigger;
responsive to the wireless communication device being in the second connection state, control the channel measurements by the wireless communication device according to the second measurement configuration,
wherein both the first connection state and the second connection state comprise states during which a radio connection is established.

25. A node for a wireless communication network, the node comprising:
a radio interface configured to control a wireless communication device; and
one or more processors configured to:
via the radio interface, transmit control information to the wireless communication device, the control information indicating at least a first measurement configuration for channel measurements to be applied in a first connection state of the wireless communication device and a second measurement configuration for channel measurements to be applied in a second connection state of the wireless communication device,
wherein in the first connection state, an active data connection of the wireless communication device to the wireless communication network is of a first type,
wherein in the second connection state, an active data connection of the wireless communication device to the wireless communication network is of a second type, and
wherein both the first connection state and the second connection state comprise states during which a radio connection is established.

* * * * *

UNITED STATES PATENT AND TRADEMARK OFFICE
CERTIFICATE OF CORRECTION

PATENT NO. : 11,323,903 B2
APPLICATION NO. : 16/348024
DATED : May 3, 2022
INVENTOR(S) : Berggren et al.

It is certified that error appears in the above-identified patent and that said Letters Patent is hereby corrected as shown below:

In the Claims

Column 20, Line 4, Claim 21: Please correct "Claim 12" to read --Claim 13--

Column 20, Lines 32-33, Claim 24: Please remove "report the channel measurements responsive to a first reporting trigger;"

Signed and Sealed this
Eleventh Day of October, 2022

Katherine Kelly Vidal
*Director of the United States Patent and Trademark Office*